United States Patent [19]

Wernsing et al.

[11] Patent Number: 4,990,543
[45] Date of Patent: Feb. 5, 1991

[54] LIGHTWEIGHT FLEXIBLE IMIDE FOAM AND METHOD OF PRODUCING SAME

[75] Inventors: David G. Wernsing, Littleton; Royce M. Feagans, Morrison; Daniel E. Near; John Sznopek, both of Littleton, all of Colo.

[73] Assignee: Manville Corporation, Denver, Colo.

[21] Appl. No.: 379,496

[22] Filed: Jul. 13, 1989

[51] Int. Cl.$^5$ .............................................. C08J 9/02
[52] U.S. Cl. ..................................... 521/129; 521/156
[58] Field of Search ................................ 521/129, 156

[56] References Cited

U.S. PATENT DOCUMENTS 3,620,987 11/1971 McLaughlin et al. ............. 521/117
3,644,234 2/1972 Grieve ................................ 521/129
4,108,810 8/1978 Baker ................................. 521/129

Primary Examiner—Morton Foelak
Attorney, Agent, or Firm—John D. Lister; Cornelius P. Quinn

[57] ABSTRACT

Described is a lightweight open-cell flexible foam having a density no greater than about 6 pounds per cubic foot, preferably less than 1.0 pound per cubic foot (pcf) comprising the reaction product of an organic polyisocyanate and a mixture of difunctional acids, acid anhydrides, and difunctional anhydrides in the presence of a tertiary amine triazine catalyst, which reactants during the manufacturing process generate carbon dioxide, wherein the ratio of imide groups in the final product is greater than 1.

7 Claims, No Drawings

LIGHTWEIGHT FLEXIBLE INIDE FOAM AND METHOD OF PRODUCING SAME

BACKGROUND OF THE INVENTION

The present application is concerned with the field of polyimide-polyamide and lightweight flexible foams. More specifically, the application is concerned with foams resulting from the reaction of organic acids/anhydrides and polyisocyanates.

U.S. Pat. No. 3,300,420 teaches the preparation of foam resins from aromatic anhydrides and isocyanates. A high polyimide content foam and a lightweight flexible foam is not fully described.

U.S. Pat. No. 3,620,987 describes the reaction of polyisocyanates, with acids and anhydrides in the presence of epoxide groups. It is desired to prepare poured in place foams using a particular combination of catalysts, in particular, materials which catalyst the reaction between the isocyanate group and an active hydrogen atom such as those utilized in synthesizing polyurethanes. Various epoxy resins are described as useful in the reaction with the isocyanate and the anhydrides.

U.S. Pat. No. 4,738,990 describes a fire-resistant foam composed of predominantly amide and imide linkages prepared utilizing a cyclic phosphorous catalyst. Heavy shrinkage of the resulting foam produced is undesirable.

It has been found that utilizing the cyclic triazine catalyst of the present invention in conjunction with utilization of multiple acid/anhydride reactants, one can achieve a lightweight, open-cell flexible foam with low shrinkage caused by the generation of carbon dioxide during the manufacturing process.

SUMMARY OF THE INVENTION

Described is a lightweight open-cell flexible foam having a density no greater than about 6 pounds per cubic foot, preferably less than about 1.0 pound per cubic foot (pcf) comprising the reaction product of an organic polyisocyanate and a mixture of difunctional acids, acid anhydrides, and difunctional anhydrides in the presence of a tertiary amine triazine catalyst, which reactants during the manufacturing process generate carbon dioxide, wherein the ratio of imide to amide groups in the final product is greater than 1.

DETAILED DESCRIPTION OF THE INVENTION

In carrying out the process of the present invention, generally the reaction takes place in the absence of a solvent. The process is generally a two or three step process where the reactants are blended or reacted together at a lower temperature which, due to the exotherm, causes the temperature to rise. In one or two steps, approximately 10% to 80%, preferably 45% to 75% of the theoretical carbon dioxide is generated. The reaction mixture is removed from the reaction vessel, cooled, and ground to a fine powder. The powder material is further reacted to completion, the foaming step, by heating at a higher temperature from about 200° to 300° C., preferably to 225° to 260° C.

A particularly important aspect of the present invention is the triazine catalysts that are utilized. The catalyst is preferably N, N', N", trisubstituted symmetrical or unsymmetrical hexahydrotriazines such as the trialkyl amino derivatives e.g. N, N', N" tris(dimethylaminomethyl)-hexahydrotriazine; N, N', N" tris(dimethylaminoethyl)hexahydrotriazine; N, N', N" tris(dimethyl-aminopropyl)hexahydrotriazine; N, N', N" tris(diethylamino-ethyl)hexahydrotriazine; N, N', N" tris(diethylaminopropyl)hexahydrotriazine; N, N', N" tris (triphenyl) hexahydrotriazine; N, N', N" tris triethanol hexahydrotriazine; N, N', N" tris trimethyl hexahydrotriazine and the like. The amount of catalyst that is used ranges from about 0.05 to about 10% by weight of the reaction mixture, preferably 0.5 to about 5% by weight of the reaction mixture.

While the triazines are the preferred catalysts to be utilized in the present application, increased conversion efficiency to a desired imide amide ratio may be enhanced by utilizing additional catalysts such as cyclic phosphorous catalysts such as the five membered phospholenes or phospholanes and four membered phosphetanes. Such cyclic phosphorous catalysts are described in U.S. Pat. No. 4,738,990 which is hereby incorporated by reference.

Other catalysts that may be employed on supplemental basis are the alkali metal oxide catalysts or the alkali metal alkoxides, phenoxides, naphthoxides, tertiary amines, such as tertiary aliphatic or aromatic amines or cyclic, fused tertiary amines e.g., triethylene diamine and the like. For a listing of such desireable catalysts, see U.S. Pat. Nos. 4,061,623 and 3,300,420 which are hereby incorporated by reference.

These supplemental catalysts may be utilized in the amount of 0.05 to about 5% by weight of the reaction mixture.

The acid/anhydrides that are utilized in the present invention are a mixture of at least two reactants. One reactant is a dianhydride while the other reactant is a dicarboxylic acid material or a material that contains both an anhydride group and a carboxylic acid group or one that can form a carboxylic acid group in situ. When the polyisocyanate reacts with the reactant containing an anhydride, the resulting reaction product is preferably an imide. In the case of a dianhydride, both anhydrides are converted to imides by virtue of the formation of carbon dioxide in situ. The second reactant which is a carboxylic group will react to form an amide with release of carbon dioxide.

Examples of polycarboxylic derivatives which can be employed as the free carboxylic acids or as intramolecular anhydrides formed from the same or different acids are: isophthalic acid, terephthalic acid, trimesic acid and phthalic acid. Examples of polycarboxylic derivatives which can be employed as the free carboxylic acids or intramolecular anhydrides thereof, are:

trimellitic acid and the anhydride thereof, pyromellitic acid and the dianhydride thereof, mellophanic acid and the anhydride thereof, benezene-1,2,3,4-tetracarboxylic acid and the dianhydride thereof, benezene-1,2,3,-tricarboxylic acid and the anhydride thereof, diphenyl-3,3', 4,4'-tetracarboxylic acid and the dianhydride thereof, diphenyl-2,2', 3,3'-tetracarboxylic acid and the dianhydride thereof, naphthalene-2,3,6,7-tetracarboxylic acid and the dianhydride thereof, naphthalene-1,2,4,5-tetracarboxylic acid and the dianhydride thereof, naphthalene-1,4,5,8-tetracarboxylic acid and the dianhydride thereof, decahydronaphthalene-1,4,5,8-tetracarboxylic acid and the dianhydride thereof,
4,8-dimethyl-1,2,3,5,6,7-hexahydronaphthalene-1,2,5,6-tetracarboxylic acid and the dianhydride thereof,
2,6-dichloronaphthalene-1,4,5,8-tetracarboxylic acid the dianhydride thereof,
2,7-dichloronaphthalene-1,4,5,8-tetracarboxylic and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianydride thereof,
bis(2,3-dicarboxyphenyl) methane and the dianhydride thereof,
bis(3,4-dicarboxyphenyl) methane and the dianhydride thereof,
1,1-bis(2,3-dicarboxyphenyl)ethane and the dianhydride thereof,
1,1-bis(3,4-dicarboxyphenyl)ethane and the dianhydride thereof,
2,2-bis(2,3-dicarboxyphenyl) propane and the dianhydride thereof,
2,3-bis(3,4-dicarboxyphenyl) propane and the dianhydride thereof,
bis(3,4-dicarboxyphenyl) sulfone and the dianhydride thereof,
bis(3,4-dicarboxyphenyl)ether and the dianhydride thereof, ethylene tetracarboxylic acid and the dianhydride thereof, butane-1,2,3,4-tetracarboxylic acid and the dianhydride thereof,
cyclopentane-1,2,3,4-tetracarboxylic acid and the dianhydride thereof,
pyrrolidien-2,3,4,5-tetracarboxylic acid and the dianhydride thereof,
pyrazine-2,3,5,6-tetracarboxylic acid and the dianhydride thereof,
mellitic acid and the trianhydride thereof,
thiophen-2,3,4,5-tetracarboxylic acid and the dianhydride thereof, and
benzophenone-3,3′, 4,4′-tetracarboxylic acid and the dianhydride thereof.

Other anhydrides which may be employed in the practice of this invention are: the intermolecular anhydride of trimellitic acid 1,2-anhydride (see, for example, U.S. Pat. No. 3,155,687); the bisanhydrides disclosed in U.S. Pat. No. 3,277,117 e.g 4,4′-ethylene glycol bisanhydro trimellitate, and the diadducts of maleic acid or anhydride with styrene.

While any of the polycarboxylic acids and intramolecular or intermolecular anhydrides thereof defined and exemplified above can be employed in the preparation of the polymers of the invention, a preferred group of compounds for this purpose are intramolecular anhydrides which are derived from polycarboxylic acids having at least three carboxyl groups of which at least two carboxyl groups are attached directly to an aromatic nucleus in ortho position with respect to each other. A particularly preferred group of polycarboxylic acid intramolecular anhydrides are those selected from the class consisting of anhydrides having the following formulae:

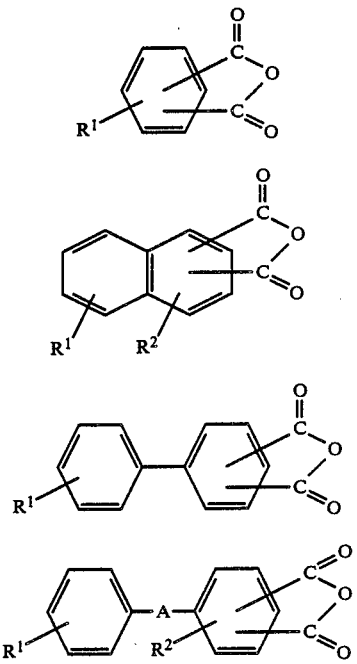

wherein at least one of $R_1$ and $R_2$ represents a group selected from the class consisting of carboxyl and the anhydride group

—C(O)—O—C(O)— the carbon atoms of the latter are each attached to adjacent carbon atoms in an aromatic ring, and wherein $R_1$ and $R_2$ optionally and additionally may represent from zero to three substituents selected from the group consisting of halogen and lower-alkyl and A is a bridging group selected from the class consisting of lower-alkylene, carbonyl, sulfonyl and oxygen.

With respect to the polyisocyanate that may be employed in the present invention, listed below are useful polyisocyanates:
propylene-1,2-diisocyanate
butylene-1,2-diisocyanate
butylene-1,3-diisocyanate
hexamethylene diisocyanate
octomethylene diisocyanate
nonamethylene diisocyanate
decanethylene diisocyanate
2,11-diisocyanato-dodecane and the like
meta-phenylene diisocyanate
para-phenylene diisocyanate
toluene-2,4-diisocyanate
toluene-2,6-diisocyanate
xylene-2,4-diisocyanate
xylene-2,6-diisocyanate
dialkyl benzene diisocyanates, such as methylpropylbenzene diisocyanate, methylethylbenzene diisocyanate and the like
2,2′-biphenylene diisocyanate
3,3′-biphenylene diisocyanate
4,4′-biphenylene diisocyanate
3,3′-dimethyl-4,4′-biphenylene diisocyanate, and the like
methylene-bis(4-phenyl isocyanate)
ethylene-bis-(4-phenyl isocyanate)

isopropylidene-bis-(4-phenyl isocyanate)
butylene-bis-(4-phenyl isocyanate)
hexafluoroisopropylidene-bis-(4-pheynl isocyanate), and the like
2,2'-oxydiphenyl diisocyanate
3,3'-oxydiphenyl diisocyanate
4,4'-oxydiphenyl diisocyanate, and the like
2,2'-ketodiphenyl diisocyanate
3,3'-ketodiphenyl diisocyanate
4,4'-ketodiphenyl diisocyanate
2,2'-thiodiphenyl diisocyanate
3,3'-thiodiphenyl diisocyanate
4,4'-thiodiphenyl diisocyanate, and the like
2,2'-sulfonediphenyl diisocyanate
3,3'-sulfonediphenyl diisocyanate
4,4'-sulfonediphenyl diisocyanate, and the like
2,2'-methylene-bis-(cyclohexyl isocyanate)
3,3'-methylene-bis-(cyclohexyl isocyanate)
4,4'-methylene-bis-(cyclohexyl isocyanate)
4,4'-ethylene-bis-(cyclohexyl isocyanate)
4,4'-propylene-bis-(cyclohexyl isocyanate)
bis-(para-isocyanato-cyclohexyl) sulfide
bis-(para-isocyanato-cyclohexyl) sulfone
bis-(para-isocyanato-cyclohexyl) ether
bis-(para-isocyanato-cyclohexyl) diethyl silane
bis-(para-isocyanato-cyclohexyl) diphenyl silane
bis-(para-isocyanato-cyclohexyl) ethyl phosphine oxide
bis-(para-isocyanato-cyclohexyl) phenyl phosphine oxide
bis-(para-isocyanato-cyclohexyl) N-phenyl amine
bis-(para-isocyanato-cyclohexyl) N-methyl amine
2,6-diisocyanato-pyridine
bis-(4-isocyanato-phenyl) diethyl silane
dichloro-biphenylene diisocyanate, bis-4-isocyanato-phenyl) ethyl phosphine oxide
bis-(4-isocyanato-phenyl) phenyl phosphine
bis-(4-isocyanato-phenyl) N-methyl amine
3,3' dimethyl-4,4'-diisocyanato biphenyl
3,3'-dimethoxy-biphenylene diisocyanate
2,4-bis-(B-isocyanato-t-butyl) toluene
bis-(para-B-isocyanato-t-butyl-phenyl) ether
para-bis-(2-methyl-4-isocyanato-phenyl) benzene
3,3'-diisocyanato adamantane
3,3'-diisocyanato biadamantane
3,3'-diisocyanatoethyl-1,1'-biadamantane
1,2-bis(3-isocyanato-propoxy) ethane
2,2'-dimethyl propylene diisocyanate
3-methoxy-hexamethylene diisocyanate
2,5-dimethyl heptamethylene diisocyanate
5-methyl-nonamethylene diisocyanate
1,4-diisocyanato-cyclohexane
1,2-diisocyanato-octadecane
2,5-diisocyanato-1,3,4-oxadiazole
$OCN(CH_2)_3O(CH_2)_2O(CH_2)_3NCO$
$OCN(CH_2)_3S(CH_2)_3NCO$
$OCN(CH_2)_3N(CH_2)_3NCO$
polymethylene polyphenyl isocyanate biurets of the formula

$OCN-R^6-N[C(O)NHR^6NCO]_2$ where $R^6$ is an alkylene group having 1–6 carbon atoms.

Mixtures of two or more of the above isocyanates can be used, such as mixtures of the 2,4- and 2,6-isomers of tolylene diisocyanate, mixtures of the 2,4' and 4,4'-isomers of methylenebis(phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example, there can be used 4,4'-methylenbis(phenyl isocyanate) or an admixture thereof with a minor amount of the 2,4'-isomer, which has been treated to convert a minor proportion, generally less than 15% by weight of the starting material. For example, the polyisocyante component can be methylenebis(phenyl isocyanate) which has been converted to a stable liquid at temperatures of about 15° C. and higher using, for example, the process described in U.S. Pat. Nos. 3,384,653, 3,394,164 and 3,394,165; polymethylene polyphenyl isocyanate mixtures wherein the methylenebis(phenyl isocyanate) content is from about 20 to about 85 percent by weight and the remainder of said mixture comprising polymethylene polyphenyl isocyanates of functionality higher than 2. In accordance with the preferred class of polyisocyanates the preferred illustrative polyisocyanates set forth above are those which fall into the aromatic diisocyanate category, most preferred are those falling in the methylenebis(phenyl isocyanate) category.

The ratio of the number of equivalents for the reactants ranges from about 0.9 to about 1.1 NCO groups to a combination of acid anhydride groups, preferably a slight excess of isocyanate groups over acid plus anhydride.

The ratio of imide to amide groups in the final product is such that it is greater than a 1 to 1 ratio preferably approximately 1.1 to approximately 19 imide groups per amide group.

The foam that is produced in the process of the present invention is one that is a light weight open cell foam having a density of less than 6 pounds per cubit foot, preferably less than 1.0 pounds per cubic foot, and greater than 1 imide to amide groups.

The open cell foam may be obtained by the two stage reaction. In the first stage, the reaction is interrupted when between 10 and 80%, preferably 45 to 75% of the theoretical $CO_2$ has evolved. Then the reaction mass is removed from the first reaction stage to a second foaming stage. There the $CO_2$ generation may be completed.

The foam of the present invention is one that has increased fire retardancy compared to polyurethane foam. It may be used in such places as confined areas, e.g., aircraft cabins, below decks in ships and the like. The use of a high imide product gives the desireable thermal stability to the product.

The imide/amide foam of the present invention can be applied by adhering to desirable substrates or between walls. An adhesive may also be applied (e.g. by spraying) to the foam and thereby applied to a wall and the like.

The imide/amide foam of the present invention can be characterized as having the following properties: High thermal stability, low shrinkage, and low density.

Having described the invention, listed below are working examples wherein all temperatures are in degrees Centigrade and all parts are by weight, unless otherwise indicated.

EXAMPLE 1

Into a resin kettle containing a heating mantel, a stirrer for the reactants, an exit for carbon dioxide to be measured and a thermo-couple for recording the temperature, is added 0.42 equivalents of methylene diphenyl diisocyanate (MDI) and heated to 140° C. under a nitrogen blanket with agitation. When the MDI reached 140° C., 0.38 equivalents of trimelletic anhydride (TMA) and 0.02 equivalents of benzophenonetetracarboxylicdianhydride (BTDA) were added. 0.70 grams of N, N', N" tris (dimethylaminopropyl) s-hexahydrotriazine (DMAPH) was added next. Reaction between the isocyanate and TMA and BTDA was evidenced by the release of $CO_2$ gas, which was measured as it passed through a wet test meter. After about 15% reaction as determined by the $CO_2$ volume released from the reactor, a silicone surfactant, L5430 (Trademark of Union Carbide), was added. After 20% of the total theoretical $CO_2$ was released, the mixer was turned off and the material was removed from the kettle and allowed to cool on an aluminum sheet.

After cooling, the 20% reacted material was placed in a 160° C. oven and allowed to heat approximately 15 minutes. This additional heating allowed the reaction to proceed to approximately 50-60% $CO_2$ generated of theoretical amount. After this material cooled, it was ground into a fine powder. Foam is prepared by placing the powder on the bottom of an aluminum tray and placing the tray in a convection oven set at approximately 230° C. The powder melts, continues to react liberating $CO_2$ which acts as the blowing agent expanding the polyamide/imide polymer to a foam. The foam is left in the oven about 40 minutes to complete foaming and to cure the foam sufficiently. The finished foam is lightweight and flexible. The theoretical imide to amide ratio of the fully reacted product is 52 imide groups/48 amide groups).

EXAMPLE 2

Utilizing a Henschel mixer, a blend was made consisting of mondur M, a flake MDI (551.3 grams), trimellitic anhydride (385.4 grams), BTDA (27.3 grams), 1, 3, 5 tris (dimethylaminopropyl) -s- hexahydrotriazine (4.7 grams) and a surfactant L5430 (Trademark of Union Carbide). This blend was fed into the feed end of a laboratory single screw extruder. The extruder has 4 temperature zones; the first zone was set at 50° C., the second one at 170° C., the third set at 180° C., and the last zone at 190° C. The material exited the extruder at a temperature of 175° C. The output was measured at 3.6 pounds/hour. The mixture was allowed to cool and then prefoamed 10 minutes at 160° C. The material from the prefoam step was ground into a fine powder. Twenty grams of powder was placed uniformly on the bottom of a 4"×6" aluminum pan and foamed at 230° C. for 40 minutes. The resulting foam exhibited slight shrinkage, fine cells, no brittleness or friability. The theoretical imide to amide ratio of the fully reacted product is 52 imide groups/48 amide groups).

EXAMPLE 3

In a 3 liter reaction kettle fitted with a heating mantle 157.5 grams of fused methylene diphenydiisocyanate (MDI) at 40° C. is added and heated under a nitrogen blanket with agitation. After the isocyanate reached 140° C., a blend of 110.1 g of trimellitic anhydride (TMA) and 7.8 g of benzophenonetetracarboxylic dianhydride (BTDA) was added. The temperature was allowed to cool to 120 C. At 120° C., 0.90 g of N, N' N" tris (dimethylaminopropyl) -s- hexahydrotriazine was added. After the triazine catalyst was added, the release of $CO_2$ increased. After 5.7 liters of $CO_2$ was released as determined by a wet test meter, 0.105 g of a silicone surfactant was added. When 7.8 liters of CO, was released from the reaction, the mixing was stopped and the mixed materials removed from the reactor kettle.

After cooling, the mixed material was further reacted by heating for 13 minutes in a convection oven at 160° C. After cooling, this material was ground into a fine powder. Foam was made by placing the powder uniformly on the bottom of an aluminum tray and placing into an oven set at 230° C. for 40 minutes. The resulting foam was lightweight, exhibited no shrinkage, brittleness, or friability. Table 1 lists physical property results of the foam. The theoretical imide to amide ratio of the fully reacted product is 52 imide groups/48 amide groups).

TABLE I

| Property | Test Method | Foam Example 3 Results | Foam Example 4 Results |
|---|---|---|---|
| Density | — | 0.55 pcf | 0.60 pcf |
| Friability | ASTM C421 | 0.574% | 3.97% |
| Planar Tensile | ASTM D3574 | 11.50 psi | 4.59 psi |
| Compression Set, 25% | ASTM D1667 | 18.62% | 23.76% |
| Compression Deflection (25%) | ASTM D1056 | 1.42 psi | 1.63 psi |

EXAMPLE 4

In a Henschel mixer was added 551.3 g Mondur M (methylene biphenyl diisocyanate in flake form), 385.4 g trimellitic anhydride (TMA) and 27.3 g of benzophenotetracarboxylic dianhydride (BTDA) and mixed for approximately two minutes. 4.7 g of N, N', N" tris (dimethylaminopropyl) -s- hexahydrotriazine and 1.75 g of a silicone surfactant was added and mixed for approximately 30 minutes.

The mixed material was allowed to react in a convection oven for 15 minutes at 160° C. The reacted material was ground into a fine powder and foamed at 230° C. for 40 minutes. The foam exhibited low friability, no brittleness, fine cells and very little shrinkage. The physical properties of this foam are listed in Table I. The theoretical imide to amide ratio of the fully reacted product is 52 imide groups/48 amide groups).

EXAMPLE 5

In a resin kettle was added 0.3633 equivalents of 143 L liquid isocyanate, 0.1733 equivalents of benzophenonetetracarboxylic dianhydride and 0.1728 equivalents of trimellitic anhydride that was ground to a fine powder. After mixing for 3 minutes, 0.3 g of N, N', N' tris (dimethylaminopropyl) -s- hexahydrotriazine was added and mixed for 3 minutes. Then, 0.14 g of a silicone surfactant was added with an additional 3 minutes for mixing. The mixed material was removed from the resin kettle and prefoamed for 7 minutes at 160° C. The prefoam was ground into a fine powder and foamed in an aluminum tray at 230° C. for 40 minutes. The resulting foam was fine celled, exhibited no shrinkage or brittleness or friability. Thermogravimetric Analysis (TGA) was performed on this foam as listed in Table II. The theoretical imide to amide ratio assuming full reaction, 3:1 imide:amide.

TABLE II

| Weight Loss, % | Thermogravimetric Analysis Sample Heated 5° C./min. in Air Temperature for Weight Loss to Occur, °C. |
|---|---|
| 10 | 503 |
| 20 | 553 |
| 30 | 569 |
| 50 | 583 |

While the invention has been described in detail and with reference to specific embodiments thereof, it will be apparent to one skilled in the art that various changes and modifications can be made therein without departing from the spirit and scope thereof.

What is claimed is:

1. A process for producing a light weight open cell foam comprising the steps of reacting in the absence of a solvent, a polyisocyanate having at least two functional groups per molecule and a mixture of a difunctional acid and a difunctional anhydride in the presence of a tertiary amine hydrazine catalyst, generating carbon dioxide in situ, interrupting the reaction when the theoretical amount of carbon dioxide generated is from about 10% to about 80%, transferring the reaction mass after the interruption step to a second stage and completing the carbon dioxide generation and forming a polyimide and polyamide foam product having a density less than 6 pounds per cubic foot and wherein the ratio of imide to amide group in the final product is no greater than 19 to 1.

2. The process of claim 1 wherein the isocyanate is an aromatic diisocyanate.

3. The process of claim 1 wherein the acid is an aromatic acid anhydride while the second reactant is a dianhydride.

4. The process of claim 1 wherein the catalyst is a hexahydrotriazine catalyst used in the amount of 0.05 to 10% by weight of the reaction mixture.

5. The process of claim 1 wherein the density is no greater than 1.0 pcf.

6. The process of claim 1 wherein the difunctional acid is an organic acid anhydride.

7. The process of claim 1 wherein the reactants are placed into an extruder and further polymerizing the reactants therein.

* * * * *

UNITED STATES PATENT AND TRADEMARK OFFICE
CERTIFICATE OF CORRECTION

PATENT NO. : 4,990,543

DATED : February 5, 1991

INVENTOR(S) : David G. Wernsing, et al

Page 1 of 2

It is certified that error appears in the above-identified patent and that said Letters Patent is hereby corrected as shown below:

ON TITLE PAGE: where the title of the invention appears, please delete the word "INIDE" and replace it with the word --- IMIDE ---.

In Column 1, Line 1, where the title of the invention appears, please delete the word "INIDE" and replace it with the word --- IMIDE ---.

In Column 5, Line 35, after the words "phenyl phosphine", insert the word --- oxide ---.

In Column 5, Line 36, please add the following line:

--- bis-(4-isocyanato-phenyl) 4-phenyl amine ---

In Column 7, Line 61, after the word "to", change "120" to --- $120°$ ---.

UNITED STATES PATENT AND TRADEMARK OFFICE
CERTIFICATE OF CORRECTION

PATENT NO.   : 4,990,543

DATED        : February 5, 1991

INVENTOR(S)  : David G. Wernsing, et al

It is certified that error appears in the above-identified patent and that said Letters Patent is hereby corrected as shown below:

In the Claims

In Claim 1, Column 9, Line 22, please delete the word "hydrazine" and insert therein the word --- triazine ---.

Signed and Sealed this

Fifteenth Day of September, 1992

Attest:

DOUGLAS B. COMER

*Attesting Officer*       Acting Commissioner of Patents and Trademarks